US012800297B2

(12) United States Patent
Zhan et al.

(10) Patent No.: US 12,800,297 B2
(45) Date of Patent: Nov. 17, 2026

(54) WHEEL ALIGNMENT CALIBRATION DEVICE AND WHEEL ALIGNMENT APPARATUS

(71) Applicant: SHENZHEN SMARTSAFE TECH CO., LTD., Shenzhen (CN)

(72) Inventors: Wei Zhan, Shenzhen (CN); Qingwei Wang, Shenzhen (CN)

(73) Assignee: SHENZHEN SMARTSAFE TECH CO., LTD., Shenzhen (CN)

( * ) Notice: Subject to any disclaimer, the term of this patent is extended or adjusted under 35 U.S.C. 154(b) by 342 days.

(21) Appl. No.: 18/673,560

(22) Filed: May 24, 2024

(65) Prior Publication Data

US 2025/0251237 A1 Aug. 7, 2025

(30) Foreign Application Priority Data

Feb. 2, 2024 (CN) ......................... 202410163724.1

(51) Int. Cl.
*G01B 11/275* (2006.01)
*G06T 7/80* (2017.01)

(52) U.S. Cl.
CPC ............ *G01B 11/2755* (2013.01); *G06T 7/80* (2017.01); *G01B 2210/12* (2013.01); *G01B 2210/14* (2013.01)

(58) Field of Classification Search
CPC .... G01B 11/27; G01B 11/275; G01B 11/2755
(Continued)

(56) References Cited

U.S. PATENT DOCUMENTS 4,034,479 A * 7/1977 Senften .................. G01B 7/315 33/203.15
5,598,358 A * 1/1997 Gender ................. G01M 17/06 33/203.18

(Continued)

FOREIGN PATENT DOCUMENTS

CN 107672594 A 2/2018
CN 112578349 A 3/2021

(Continued)

OTHER PUBLICATIONS

European Search Report for European Application No. EP 24177875.2, Mailed Nov. 11, 2024, 25 pages.

(Continued)

*Primary Examiner* — George B Bennett
(74) *Attorney, Agent, or Firm* — Brooks Kushman P.C.

(57) ABSTRACT

The application provides a wheel alignment calibration device and a wheel alignment apparatus. The wheel alignment calibration device includes: a calibration box, a calibration component located in the calibration box, and a fixing member connected to the calibration box; the calibration box defines a calibration direction, the calibration box is provided with a calibration space and a calibration opening communicated with the calibration space. The calibration component is located in the calibration space and can be exposed to the calibration opening in the calibration direction. The fixing member is configured to fix the calibration box on the lift carrying the vehicle, so that the opening direction of the calibration opening is set obliquely downward, and the wheel alignment calibration device is configured to achieve calibration based on the calibration direction through the calibration component.

20 Claims, 3 Drawing Sheets

(58) Field of Classification Search
USPC ............................................. 33/203, 203.12
See application file for complete search history.

(56) References Cited

U.S. PATENT DOCUMENTS

| | | | | |
|---|---|---|---|---|
| 7,062,860 | B2 * | 6/2006 | Hara | G01M 17/013 33/203.12 |
| 7,089,776 | B2 * | 8/2006 | Dale, Jr. | G01B 11/275 33/203.18 |
| 7,313,869 | B1 * | 1/2008 | Rogers | H04N 7/183 33/203.18 |
| 7,640,673 | B2 * | 1/2010 | Jackson | G01B 11/2755 356/139.09 |
| 8,418,543 | B2 * | 4/2013 | Tentrup | G01B 11/2755 73/117.02 |
| 10,556,780 | B2 * | 2/2020 | Zecher | B66F 7/28 |
| 10,871,368 | B2 * | 12/2020 | Krueger | G01B 11/2755 |
| 11,953,315 | B2 * | 4/2024 | Inoue | G01M 17/013 |
| 2023/0196620 | A1 | 6/2023 | Zhang et al. | |

FOREIGN PATENT DOCUMENTS

| | | | | | |
|---|---|---|---|---|---|
| CN | 218822167 | U | | 4/2023 | |
| CN | 117451381 | A | | 1/2024 | |
| CN | 221882486 | U | * | 10/2024 | |
| CN | 121347170 | A | * | 1/2026 | G01M 17/00 |
| DE | 102018008539 | A1 | | 12/2019 | |

OTHER PUBLICATIONS

Chinese Search Report for Chinese Application No. PCT/CN2024/087161, Mailed Oct. 31, 2024, 4 pages.

* cited by examiner

WHEEL ALIGNMENT CALIBRATION DEVICE AND WHEEL ALIGNMENT APPARATUS

CROSS-REFERENCE TO RELATED APPLICATIONS

The present application claims the priority of Chinese patent application No. 202410163724.1 filed on Feb. 2, 2024, the entire contents of which are incorporated herein by reference.

TECHNICAL FIELD

The present application relates to the technical field of wheel alignment apparatus, and in particular, to a wheel alignment calibration device and a wheel alignment apparatus.

BACKGROUND

With the development of technology and economy and the rapid growth in the number of automobile ownerships, the automobile testing technology is also in constant development. As an important aspect of vehicle testing, the wheel alignment parameter testing is significant for the safety of the whole car. Abnormalities in the wheel alignment parameters will lead to a series of economic and safety issues such as abnormal wear and tear of tires, driving bias, wheel vibration, heavy steering, and increase in fuel consumption, directly affecting the driving safety and daily use of cars.

Currently, existing wheel alignment apparatus on the market includes a wheel alignment measuring device and a wheel alignment calibration device, the wheel alignment measuring device calibrates its own position by obtaining an image of a calibration component of the wheel alignment measuring device, and the calibration component is susceptible to interference from ambient light during the calibration process, resulting in an unclear image obtained by the wheel alignment measuring device, which affects the accuracy of the calibration.

SUMMARY

An objective of the present application is to provide a wheel alignment calibration device and a wheel alignment apparatus to at least solve the problem that the existing wheel alignment calibration device is easily disturbed by ambient light, resulting in an unclear image obtained by the wheel alignment measuring device, which affects calibration accuracy.

In order to achieve the above objective, the technical proposals adopted by the present application are as follows.

In a first aspect, a wheel alignment calibration device is provided, including: a calibration box, a calibration component arranged in the calibration box, and a fixing member connected to the calibration box; the calibration box defines a calibration direction, the calibration box is provided with a calibration space and a calibration opening communicated with the calibration space, the calibration component is arranged in the calibration space and is able to be exposed to the calibration opening in the calibration direction, the fixing member is configured to fix the calibration box on a lift carrying a vehicle so that an opening direction of the calibration opening is set obliquely downward, and the wheel alignment calibration device is configured to realize calibration based on the calibration direction through the calibration component.

By adopting the above technical proposal, when the fixing member fixes the calibration box to the lift used to carry the vehicle, the opening direction of the calibration opening of the calibration box is set obliquely downward, which reduces the possibility of the calibration component being exposed to ambient light, improves the clarity of the image of the calibration component taken by the wheel alignment measuring device, and thus improves the accuracy of the calibration.

In one embodiment, when the calibration box is fixed to the lift, the opening direction of the calibration opening forms a first inclination angle ranging from 0° to 90° with a horizontal plane.

In one embodiment, the calibration direction and the opening direction of the calibration opening form a second inclination angle, and the second inclination angle is in a range between 0° and 90°.

In one embodiment, the calibration box defines a plurality of calibration directions facing different directions, and the calibration box is provided with calibration openings respectively corresponding to each of the calibration directions.

In one embodiment, the calibration box includes a calibration base, a calibration cover and a calibration support, the calibration cover is arranged above the calibration base, the calibration support connects the calibration cover and the calibration base, and the calibration space and the calibration opening are arranged between the calibration base, the calibration cover and the calibration support.

In one embodiment, edges of a projection of the calibration cover on the calibration base in a direction perpendicular to the calibration base exceed the calibration base, and the calibration support extends outward from the calibration base toward an obliquely upward direction, so that the opening direction of the calibration opening is arranged obliquely downward.

In one embodiment, the calibration component is connected to the calibration cover, so that the calibration component is orientated inversely in the calibration space.

In one embodiment, the fixing member extends from the calibration box in a direction toward the lift, and an edge of a contacting surface of the fixing member for connecting with the lift is provided with a chamfered part.

In one embodiment, a handle is arranged on a side of the calibration box facing away from the fixing member, and the handle is disposed opposite to the fixing member.

In one embodiment, the calibration box further includes a lighting member, the lighting member is disposed on an inner bottom surface of the calibration box, and a lighting range of the lighting member covers the calibration component.

In one embodiment, the calibration box further includes a reflective member, the reflective member is disposed on an inner top surface of the calibration box and is arranged opposite to the lighting member. The reflective member is configured to reflect the light emitted by the lighting member.

In one embodiment, the calibration box is further provided with a light-transmitting cover disposed on the calibration opening, and the light-transmitting cover is configured to restrict passage of visible light and allow passage of light of a predetermined wavelength.

In one embodiment, the light-transmitting cover is made of infrared glass, and the light of the predetermined wavelength is an infrared ray.

In one embodiment, the wheel alignment calibration device further includes a camera device and a camera device connector. One end of the camera device connector is connected to the calibration base, and the other end of the camera device connector is connected to the camera device, so that a projection of the camera device and a projection of the calibration component along any one of the calibration directions do not overlap each other.

In one embodiment, the one end of the camera device connector is connected to a side or bottom of the calibration base, and the other end of the camera device connector is connected to a side or bottom of the camera device.

In a second aspect, a wheel alignment apparatus is provided, including a wheel alignment measuring device and the above-mentioned wheel alignment calibration device. The wheel alignment measuring device is disposed in the calibration direction and configured to obtain an image of the calibration component to calibrate its own position.

BRIEF DESCRIPTION OF THE DRAWINGS

In order to more clearly illustrate the technical proposals in the embodiments of the present application, the drawings required to be used in the embodiments will be briefly introduced below. Apparently, the drawings in the following description are only some embodiments of the present application. Those of ordinary skill in the art can also obtain other drawings based on these drawings without exerting creative efforts.

REFERENCE SIGNS ARE AS FOLLOWS

Figure 1:
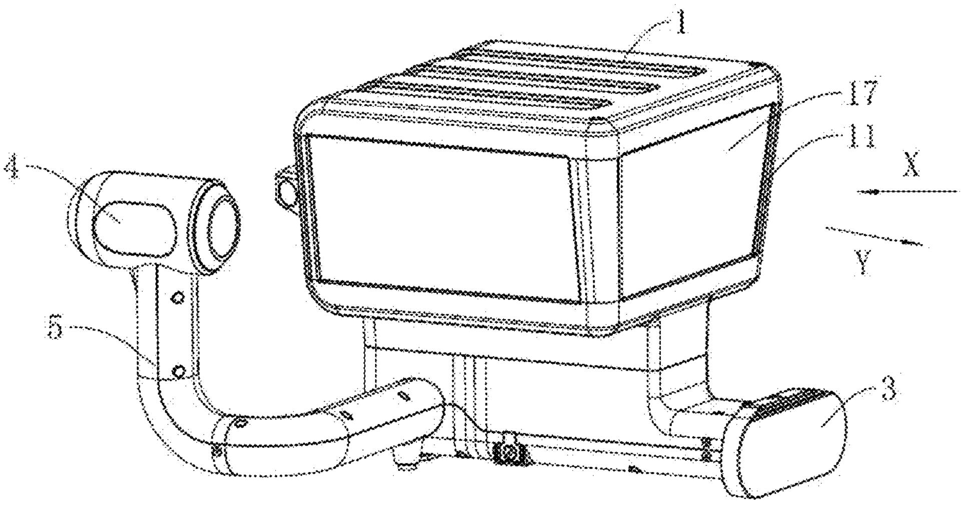
FIG. 1 is a perspective structural view of a wheel alignment calibration device provided in an embodiment of the present application.

1 calibration box; 2 calibration component; 3 fixing member; 4 camera device; 5 camera device connector; X, calibration direction; Y, opening direction;

11 calibration opening; 21 calibration rod; 22 calibration ball; 12 calibration base; 13 calibration cover; 14 calibration support; 15 lighting member; 16 reflective member; 17 light-transmitting cover; 18 handle; 31 chamfered part; 51 first connecting section; and 52 second connecting section.

DETAILED DESCRIPTION OF THE EMBODIMENTS

In order to make the above objects, features and advantages of the present application clearer and easier to understand, the present application will be described in detail below with reference to the accompanying drawings and embodiments. It should be understood that the embodiments described herein are for illustrative purposes only and should not be construed as limiting the present application.

It should be noted that when an element is referred to as being "fixed to" or "disposed on" another element, it can be directly on the other element or indirectly on the other element. When an element is referred to as being "connected to" another element, it may be directly connected or indirectly connected to the other element.

It should be understood that terms "lengthwise", "widthwise", "upper", "lower", "front", "rear", "left", "right", "vertical", "horizontal", "top", "bottom", "inside", "outside", etc. indicating orientation or positional relationship are based on the orientation or positional relationship shown in the drawings, and are merely for the convenience of describing the present application and simplifying the description, rather than indicating or implying that the device or element referred to must have a specific orientation, be constructed and operate in a specific orientation, and therefore cannot be construed as limiting the present application.

In addition, terms "first" and "second are used for descriptive purposes only and cannot be understood as indicating or implying the relative importance or implicitly indicating the quantity of the indicated features. In the description of this application, the term "a plurality of" means two or more, unless otherwise expressly and specifically defined. Embodiments of the present application will be described in detail below with reference to the accompanying drawings.

Figure 2:
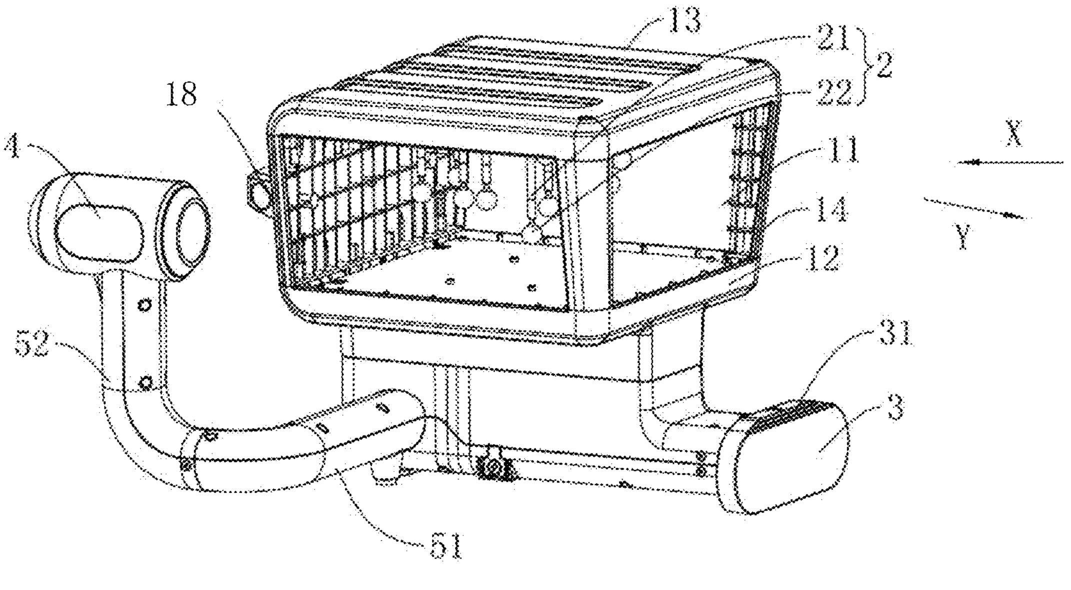
FIG. 2 is a perspective structural view of the wheel alignment calibration device provided in the embodiment of the present application, with the light-transmitting cover of the calibration opening being omitted.

FIGS. 1 and 2 show a wheel alignment calibration device provided by an embodiment of the present application applied in a wheel alignment apparatus. The vehicle wheel alignment apparatus includes a wheel alignment measuring device and a wheel alignment calibration device. The wheel alignment calibration device includes a calibration component, and the wheel alignment measuring device is configured to obtain an image of the calibration component, and then determine its own position so as to calibrate its own position. The wheel alignment calibration device of this embodiment can reduce the influence of ambient light, improve the clarity of the calibration image of the calibration component obtained by the wheel alignment measuring device, thereby improving the calibration accuracy. This will be explained through the following detailed embodiments.

The wheel alignment calibration device of this embodiment includes:

a calibration box 1, a calibration component 2 arranged in the calibration box 1, and a fixing member 3 connected to the calibration box 1; the calibration box 1 defines a calibration direction, the calibration box 1 is provided with a calibration space and a calibration opening 11 communicated with the calibration space, the calibration component 2 is arranged in the calibration space and can be exposed to the calibration opening 11 in the calibration direction X, the fixing member 3 is configured to fix the calibration box 1 on a lift carrying a vehicle, so that an opening direction Y of the calibration opening 11 is set obliquely downward, and the wheel alignment calibration device is configured to realize calibration based on the calibration direction X through the calibration component 2.

Here, it can be understood that the calibration box 1 is configured to accommodate the calibration component 2, so that the calibration component 2 is located in a space with stable brightness. Specifically, the calibration box 1 is provided with a calibration space and a calibration opening 11, the calibration space is configured to accommodate the calibration component 2, so that the calibration component 2 is in a space with stable brightness. The calibration opening 11 is communicated with the calibration space, so that the calibration component 2 can be exposed through the calibration opening 11. The calibration box 1 defines a calibration direction X. The wheel alignment measuring device is disposed in the calibration direction X and is configured to obtain an image of the calibration component 2 in the calibration space through the calibration opening 11 along the calibration direction X and analyze its own position through processing and analyzing the image, thereby realize the calibration of its own position.

The calibration component 2 is a component used to calibrate the position of the wheel alignment measuring device. Specifically, the calibration component 2 is arranged in the calibration space. The wheel alignment measuring device is used to obtain an image of the calibration component 2, and then obtain its own position by analyzing the image, thereby calibrating its own position.

The fixing member 3 is used to fix the calibration box 1 on the lift that carries the vehicle. Specifically, when performing a wheel alignment examination, the vehicle is carried on the lift, the lift is configured to lift the vehicle to a certain height for the wheel alignment examination. The fixing member 3 is used to fix the calibration box 1 on the lift, so that the wheel alignment calibration device can calibrate the wheel alignment measuring device, thereby facilitating the subsequent wheel alignment examination. The fixing member 3 fixes the calibration box 1 on the lift, so that the opening direction Y of the calibration opening 11 is set obliquely downward; since the wheel alignment calibration device is usually placed at a position close to the ground, the calibration component 2 is mostly affected by ambient light from above the calibration component 2, such as the lights in the site where the wheel alignment examination is performed, or the sunlight from outside. When the calibration component 2 is arranged in the calibration space, since the opening direction Y of the calibration opening 11 is facing obliquely downward, the ambient light cannot directly enter the calibration opening 11 arranged obliquely downward from above, thereby reducing the possibility of the calibration component 2 being illuminated by the ambient light, and improving the clarity of the image of the calibration component 2 taken by the wheel alignment measuring device.

The operation mechanism of the wheel alignment calibration device of this embodiment is as follows.

The wheel alignment apparatus includes four wheel alignment measuring devices and two wheel alignment calibration devices. The four wheel alignment measuring devices are arranged corresponding to each of the four tires of the vehicle. One wheel alignment calibration device is provided between two wheel alignment measuring devices located on the same side, and the wheel alignment measuring devices are located in the calibration direction X of the wheel alignment calibration device. The wheel alignment measuring device capture a calibration image of the calibration component 2 in the wheel alignment calibration device through the calibration opening 11 along the calibration direction X, so as to calibrate its own position.

By adopting the above technical proposal, when the fixing member 3 fixes the calibration box 1 to the lift that carries the vehicle, the opening direction Y of the calibration opening 11 of the calibration box 1 is set obliquely downward, which reduces the possibility of the calibration component 2 being exposed to ambient light, improves the clarity of the image of the calibration component 2 taken by the wheel alignment measuring device, and thus improves the accuracy of the calibration.

In one embodiment, when the calibration box 1 is fixed to the lift, the opening direction Y of the calibration opening 11 forms a first inclination angle of 0° to 90° with the horizontal plane.

Here, it can be understood that the opening direction Y of the calibration opening 11 is set obliquely downward, so that when the calibration box 1 is fixed to the lift, the opening direction Y of the calibration opening 11 forms a first inclination angle with the horizontal plane, and the range of the first inclination angle is between 0° and 90°.

Optionally, the first inclination angle is 15°, 30°, 45°, 60°, or 75°.

It should be noted that the wheel alignment measuring device is located in the calibration direction X and obtains a photo of the calibration component 2 in the calibration box 1 through the calibration opening 11, such that the opening direction Y of the calibration opening 11 can be set to cooperate with the position of the wheel alignment measuring device, so that the wheel alignment calibration device of this embodiment can be provided with different calibration openings 11 according to different wheel alignment measuring devices during manufacture.

By adopting the above technical proposal, the calibration opening 11 configured within the range of the first inclination angle can reduce the possibility of ambient light entering from the calibration opening 11, while taking into account the installation position of the wheel alignment measuring device.

In one embodiment, the calibration direction X forms a second inclination angle with the opening direction Y of the calibration opening 11, and the second inclination angle ranges from 0° to 90°.

Optionally, the second inclination angle is 15°, 30°, 45°, 60°, or 75°.

Here, it can be understood that since the vehicle is placed on a horizontal plane during wheel alignment, a connecting line between the wheel alignment measuring devices located on the same side is also parallel to the horizontal direction during wheel alignment. Therefore, the calibration direction X of the calibration component is also set to be parallel to the horizontal direction. Since the opening direction Y of the calibration opening 11 is set obliquely downward, so that the opening direction Y of the calibration opening 11 is at a second inclination angle to the calibration direction X, namely, the wheel alignment measuring device can photograph the calibration component 2 through the calibration opening 11 when arranged along the calibration direction X.

By adopting the above technical proposal, the calibration direction X and the opening direction Y of the calibration opening 11 form a second inclination angle, and the range of the inclined angle of the calibration direction X takes into account the installation positions of the wheel alignment measuring device and the wheel alignment calibration device.

In one embodiment, the calibration box 1 defines a plurality of calibration directions X facing different directions, and the calibration box 1 is provided with calibration openings 11 corresponding to each of the calibration directions X.

Here, it can be understood that the plurality of calibration directions X are defined on the wheel alignment calibration device, and the calibration box 1 is provided with a plurality of calibration openings 11 corresponding to each of the calibration directions, so that one wheel alignment calibration device can be used to calibrate the positions of multiple wheel alignment measuring devices. Specifically, the calibration directions X face different directions, that is, the directions of the plurality of calibration openings 11 also correspond to the calibration directions X, for exposing the calibration component 2 to different directions.

By adopting the above technical proposal, one wheel alignment calibration device can calibrate multiple wheel alignment measuring devices, thereby saving the number of wheel alignment calibration devices arranged in the calibration process, reducing the cost of the calibration process, and improving the calibration efficiency.

Figure 3:
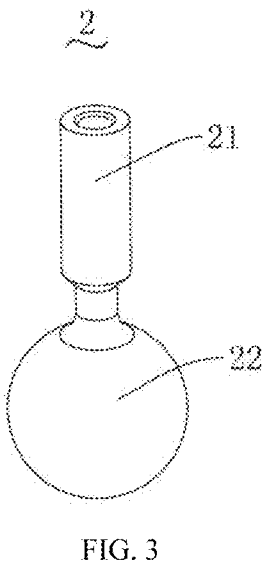
FIG. 3 is a perspective structural view of a calibration component provided in an embodiment of the present application.

Referring to FIG. 3, in one embodiment, the calibration component 2 includes a calibration rod 21 and a calibration ball 22 arranged on the calibration rod 21. The calibration rod 21 is connected to an inner top surface of the calibration box 1, and the calibration ball 22 is arranged on the end of the calibration rod 21 away from the inner top surface of the calibration box 1.

Here, it can be understood that the calibration rod 21 is configured to support the calibration ball 22, and the calibration ball 22 is used for the wheel alignment measuring device to obtain an image.

Specifically, the calibration rod 21 is vertically arranged on the inner top surface of the calibration box 1, and the calibration ball 22 is used for the wheel alignment measuring device to obtain an image. The wheel alignment measuring device captures an image of the calibration ball 22, and determines a coordinate value according to the center of the calibration ball 22, so as to calibrate the position of the wheel alignment measuring device. The calibration rod 21 is used to maintain the calibration ball 22 at a preset height, so that the wheel alignment measuring device can capture the calibration ball 22 at the preset height, which is beneficial for the wheel alignment measuring device to determine the coordinate value.

Optionally, the calibration ball 22 is in a spherical shape, and the camera of the wheel alignment measuring device can calculate the center of the calibration ball 22 from either the side or front of the calibration ball 22. When calibrating the wheel alignment measuring device, images of the calibration ball 22 must be obtained from different calibration directions X, that is, the images of the calibration ball 22 obtained from different angles are all in a circular shape.

The operating mechanism of the calibration component 2 of this embodiment is as follows.

The calibration component 2 is fixed near the vehicle, for example, it can be provided between two wheel alignment measuring devices corresponding to two tires. The calibration rod 21 has a preset height, and the calibration rod 21 supports the calibration ball 22 so that the calibration ball 22 is located at a preset height. The wheel alignment measuring device is configured to obtain an image of the calibration ball 22. The image of the calibration ball 22 is a circle. The wheel alignment measuring device analyzes the center of the circle in the image of the calibration ball 22 and analyzes the coordinate value, and then calibrates the position of the wheel alignment measuring device.

It should also be noted that the wheel alignment measuring device can take images of the calibration ball 22 from a plurality of calibration directions X, because regardless of the calibration direction X that the image of the calibration ball 22 is taken, the image is always a circle, and the center of the circle is unchanged. Therefore, the calibration ball 22 of this embodiment is applicable for calibrating wheel alignment measuring devices located in a plurality of calibration directions.

By adopting the above technical proposal, only one calibration component 2 is required to complete the calibration operation of the wheel alignment measuring devices located in multiple directions, thereby improving the consistency of the calibration results and reducing the errors in the calibration results.

In one embodiment, the calibration box 1 includes a calibration base 12, a calibration cover 13, and a calibration support 14. The calibration cover 13 is located above the calibration base 12. The calibration support 14 connects the calibration cover 13 and the calibration base. A calibration space and a calibration opening 11 are provided between the calibration base 12, the calibration cover 13 and the calibration support 14.

Here, it can be understood that the calibration base 12 and the calibration cover 13 are arranged opposite to each other, and the calibration support 14 is configured to support the calibration cover 13 so that the calibration cover 13 can be located above the calibration base 12. A calibration space and a calibration opening 11 are provided between the calibration base 12, the calibration cover 13 and the calibration support 14.

By adopting the above technical proposal, the structure of the calibration box 1 is simple, and the calibration space and the calibration opening 11 are simply formed.

In one embodiment, edges of a projection of the calibration cover 13 on the calibration base 12 along a direction perpendicular to the calibration base 12 exceed the calibration base 12, and the calibration support 14 extends outwardly from the calibration base 12 in an obliquely upward direction, so that the opening direction Y of the calibration opening 11 is set obliquely downward.

Here, it can be understood that since the ambient light shines down from above the calibration box 1, the edges of the calibration cover 13 are set to exceed the edges of the calibration base 12, such that the calibration cover 13 can be configured to block the ambient light directly entering into the calibration opening 11 from above the calibration box 1. In addition, the calibration support 14 is arranged obliquely so that the opening direction Y of the calibration opening 11 defined by the calibration cover 13, the calibration base 12 and the calibration support 14 is set obliquely downward.

By adopting the above technical proposal, the possibility of ambient light directly entering the calibration space from the calibration opening 11 is further reduced, and the clarity of the image of the calibration component 2 is improved.

In one embodiment, the calibration component 2 is connected to the calibration cover 13 so that the calibration component 2 is orientated inversely in the calibration space.

The calibration component 2 is connected to the inner top surface of the calibration box 1, that is, the calibration component 2 is placed inversely in the calibration space. Since the calibration component 2 is usually placed close to the ground when in use, most of the ambient light affecting the calibration component 2 comes from above the calibration component 2, for example, the light in the site where the wheel alignment is performed, or the sunlight from outdoors. When the calibration component 2 is placed inversely in the calibration space, the ambient light will be blocked by the inner top surface of the top of the calibration box 1, reducing the possibility of the calibration component 2 being illuminated by ambient light, and improving the clarity of the image of the calibration component 2 captured by the wheel alignment measuring device.

By adopting the above technical proposal, the calibration cover 13 blocks the ambient light from above, reducing the possibility of ambient light interfering with the calibration component 2, improving the image clarity of the calibration component 2 captured by the wheel alignment measuring device, thereby improving the accuracy of the calibration results.

In one embodiment, the fixing member 3 extends from the calibration box 1 in a direction toward the lift, and an edge of the contacting surface of the fixing member 3 for connecting with the lift is provided with a chamfered part 31.

Here, it can be understood that the chamfered part 31 includes but is not limited to a rounded chamfered part 31 or a straight chamfered part 31. The chamfered part 31 can prevent the edge of the contacting surface of the fixing member 3 from forming sharp corners that affect the assembly and disassembly of the fixing member 3.

Specifically, the fixing member 3 includes but is not limited to a magnetic member, that is, the wheel alignment calibration device can be magnetically fixed on the lift to facilitate the operator to disassemble and assemble the wheel alignment calibration device. During the disassembly and assembly process, the fixing member 3 is provided with a chamfered part 31 to prevent sharp corners of the fixing member 3 from damaging the lift.

By adopting the above technical proposal, the possibility of the fixing member 3 damaging the lift when the operator disassembles and assembles the wheel alignment calibration device is reduced.

In one embodiment, a handle 18 is provided on a side of the calibration box 1 facing away from the fixing member 3, and the handle 18 is arranged opposite to the fixing member 3.

By adopting the above technical proposal, the operator can remove the wheel alignment calibration device through the handle 18, and the handle 18 and the fixing member 3 are arranged opposite to each other, which is convenient to operate.

Figure 4:
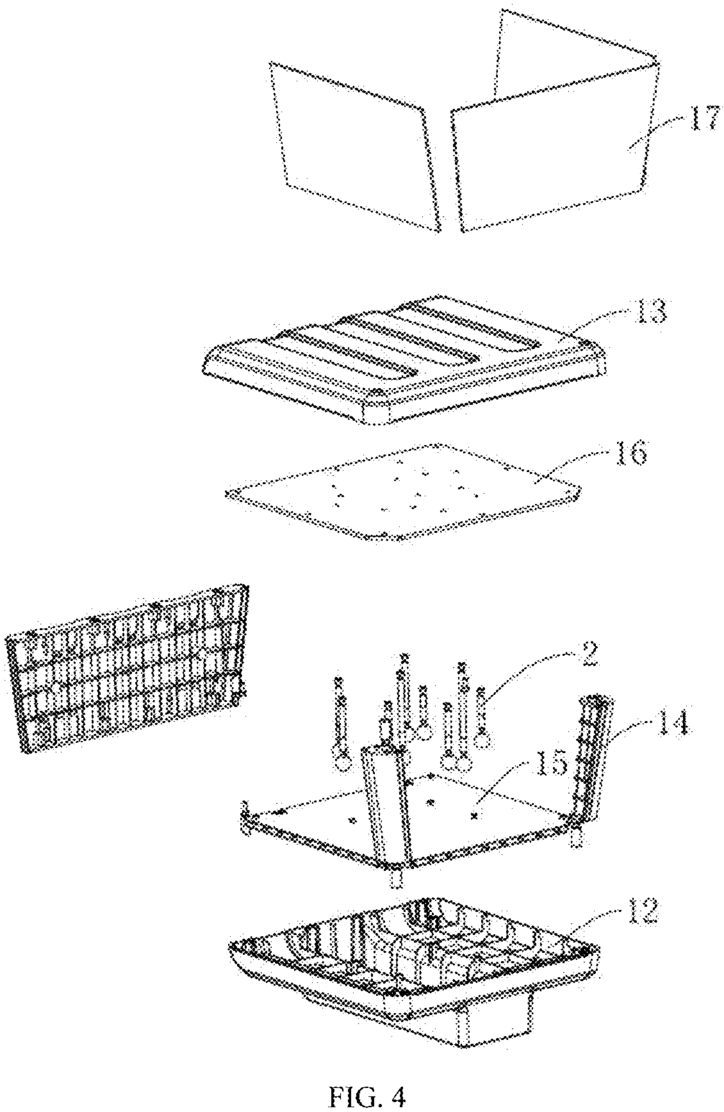
FIG. 4 is an exploded view of the wheel alignment calibration device provided by an embodiment of the present application when viewed from one angle.
Figure 5:
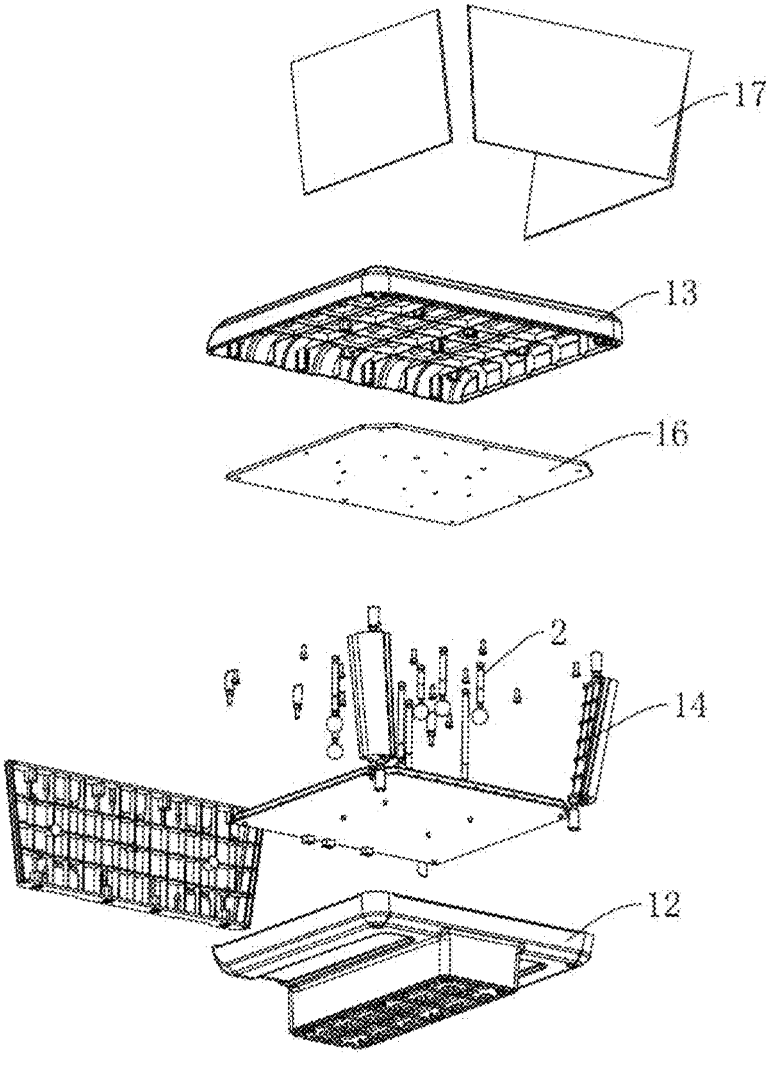
FIG. 5 is another exploded view of the wheel alignment calibration device provided by the embodiment of the present application when viewed from another angle.

Referring to FIG. 4 and FIG. 5, in one embodiment, the calibration box 1 further includes a lighting member 15. The lighting member 15 is disposed on an inner bottom surface of the calibration box 1. The lighting range of the lighting member 15 covers the calibration component 2.

Here, it can be understood that the lighting member 15 is configured to emit light from the inner bottom surface of the calibration box 1 toward the inner top surface of the calibration box 1, that is, the lighting range of the lighting member 15 covers the calibration component 2, providing a uniform lighting environment for the calibration component 2.

By adopting the above technical proposal, the lighting range of the lighting member 15 covers the calibration component 2, so that the calibration space forms a space with stable and uniform lighting, which improves the clarity of the calibration component 2 when being photographed.

In one embodiment, the calibration box 1 further includes a reflective member 16. The reflective member 16 is provided on the inner top surface of the calibration box 1 and is opposite to the lighting member 15. The reflective member 16 is configured to reflect the light emitted by the lighting member 15.

Here, it can be understood that, in order to further improve the uniformity of illumination in various parts of the calibration space, a reflective member 16 is provided on the opposite side of the lighting member 15, and the reflective member 16 is configured to reflect the light from the lighting member 15, so that the uniformity of illumination in the calibration space is improved. Additionally, the cost of the reflective member 16 is lower than the cost of the lighting member 15, so that both the uniformity of illumination in the calibration space and the manufacturing cost are taken into consideration.

By adopting the above technical proposal, the uniformity of illumination in the calibration space is further improved.

In one embodiment, the calibration box 1 is further provided with a light-transmitting cover 17 disposed on the calibration opening 11. The light-transmitting cover 17 is configured to restrict the passage of visible light and allow the passage of light of a predetermined wavelength.

Here, it can be understood that, in order to further improve the clarity of the calibration component 2 captured by the wheel alignment measuring device, the lighting member 15 emits light of a predetermined wavelength toward the calibration component 2, and the wheel alignment measuring device obtains the light reflected by the calibration component 2, thereby obtaining an image of the calibration component 2. Since only light of a predetermined wavelength can pass through the light-transmitting cover 17 to enter and exit the calibration space, the impact of ambient light entering the calibration space on the calibration component 2 is further reduced.

By adopting the above technical proposal, the possibility of ambient light entering the calibration space is further reduced, and the clarity of the image of the calibration component 2 is improved.

In one embodiment, the light-transmitting cover 17 is an infrared glass, and the light of the predetermined wavelength is an infrared ray.

By adopting the above technical proposal, the infrared glass allows only infrared rays to enter and exit the calibration space, which is beneficial for the wheel alignment measuring device to obtain the image of the calibration component 2 through the reflection of infrared rays.

In one embodiment, the wheel alignment calibration device also includes a camera device 4 and a camera device connector 5. One end of the camera device connector 5 is connected to the calibration base 12, and the other end of the camera device connector 5 is connected to the camera device 4, so that projections of the camera device 4 and the calibration component 2 along any calibration direction X do not overlap with each other.

Here, it can be understood that the calibration base 12 is configured to support the calibration component 2, and the calibration component 2 is configured to provide a calibration image to calibrate the position of the wheel alignment measuring device and the wheel alignment calibration device on the opposite side. The camera device 4 is used to obtain the image of the wheel alignment calibration device on the opposite side. The camera device connector 5 is used to connect the camera device 4 and the calibration base 12.

Specifically, the calibration component 2 is disposed on the calibration base 12, and the calibration base 12 is separated from the wheel alignment measuring device by a preset distance. This is convenient for the wheel alignment measuring device to obtain an image of the calibration component 2 on the calibration base 12. This also facilitates the wheel alignment measuring device to calculate coordinate values based on the distance from the calibration base 12. The calibration base 12 defines at least two calibration directions X, and the calibration directions X are parallel to the calibration base 12, specifically, the calibration directions X are parallel to the surface of the calibration base 12 that supports the calibration component 2. Both the wheel alignment measuring device and the wheel alignment calibration device are located in one of the calibration directions X. That is, the wheel alignment measuring device is able to obtain an image of the wheel alignment calibration device in the calibration direction X, which is a calibration image, namely, the wheel alignment measuring device is able to obtain an image of the calibration component 2 along the calibration direction X, so that it analyzes and thus calibrates its own position. Similarly, the wheel alignment measuring device and the wheel alignment calibration device on the opposite side are both located in another calibration direction X, that is, the wheel alignment measuring device on the opposite side is able to obtain an image of the wheel alignment calibration device in the calibration direction X, which is a calibration image, namely, the wheel alignment measuring device is able to obtain an image of the calibration component 2 along the calibration direction X, so that it analyzes and thus calibrates its own position.

By adopting the above technical proposal, the following advantageous effects can be obtained.

The plurality of wheel alignment measuring devices of the wheel alignment apparatus can obtain the calibration images of the calibration component 2 from different calibration directions X, so that the plurality of wheel alignment measuring devices can share one wheel alignment calibration device for calibration, which reduces the demand for wheel alignment calibration devices and improves the calibration efficiency. Additionally, the calibration base 12 defines at least two calibration directions X, which can also improve the accuracy of the calibration results.

One end of the camera device connector 5 is connected to the calibration base 12, and the other end of the camera device connector 5 is connected to the camera device 4, so that the projections of the camera device 4 and the calibration component 2 along any calibration direction X do not overlap with each other. This allows the camera device 4 to avoid the calibration component 2 and reduces the possibility of the camera device 4 blocking the calibration component 2. By applying the camera device connector 5 to the wheel alignment apparatus, the possibility of errors in the calibration results can be reduced and the accuracy of the detection results of the wheel alignment apparatus can be improved.

In one embodiment, one end of the camera device connector 5 is connected to the side or bottom of the calibration base 12, and the other end of the camera device connector 5 is connected to the side or bottom of the camera device 4.

Here, it can be understood that the connection part between the camera device connector 5 and the calibration base 12 and the camera device 4 includes the side and the bottom thereof. Apparently, the camera device 4 can also be movably connected or slidably connected to the camera device connector 5 for adjusting its position, such as adjusting the height of the camera device 4 to adapt to different heights of photographing.

By adopting the above technical proposal, there are various connection positions between the camera device connector 5 and the calibration base 12 and the camera device 4, and the connection manner is highly flexible; additionally, the camera device 4 also has the advantage of high flexibility of adjustment.

In one embodiment, the camera device connector 5 includes a first connecting section 51 and a second connecting section 52 connected to the first connecting section 51. The first connecting section 51 is configured to connect to the side of the calibration base 12, and the first connecting section 51 extends along a first direction perpendicular to the side. Here, the first direction is parallel to one of the calibration directions X. The second connecting section 52 is configured to connect to the bottom of the camera device 4. The second connecting section 52 extends along a second direction perpendicular to the first direction, so that the camera device 4 can photograph another calibration base 12 while avoiding the side of the calibration base 12.

Here, it can be understood that the first connecting section 51 is configured to connect to the calibration base 12, the second connecting section 52 is configured to connect to the camera device 4, and the second connecting section 52 is connected to the first connecting section 51, so that the camera device 4 is connected with the calibration base 12.

Specifically, the first connecting section 51 and the second connecting section 52 are connected, the first connecting section 51 is connected to the calibration base 12, and the first connecting section 51 extends along the first direction; the second connecting section 52 is connected to the camera device 4, and the second connecting section 52 extends along the second direction, and the second direction is perpendicular to the first direction. Since the first connecting section 51 is connected to the calibration base 12 and extends along the first direction, that is, the second connecting section 52 connected to the first connecting section 51 can be spaced apart from the calibration base 12 by a distance equal to the first connecting section 51 in the first direction; and since the second connecting section 52 is connected to the camera device 4, and the second connecting section 52 extends along the second direction, so that the camera device 4 can be spaced apart from the first connecting section 51 by a distance equal to the second connecting section 52 in the second direction. Therefore, the arrangement of the first connecting section 51 and the second connecting section 52 enables the camera device 4 to be spaced apart from the calibration base 12 by a preset distance in both the first and second directions, thereby reducing the possibility of the camera device 4 blocking the calibration base 12.

By adopting the above technical proposal, the camera device connector 5 includes a first connecting section 51 and a second connecting section 52 connected to the first connecting section 51, the first connecting section 51 extends in a first direction, and the second connecting section 52 extends in a second direction perpendicular to the first direction, so that the camera device 4 on the second connecting section 52 can avoid the calibration base 12 on the first connecting section 51, reducing the possibility of the camera device 4 blocking the calibration base 12. By applying the camera device connector 5 to the wheel alignment apparatus, the possibility of errors in the calibration results can be reduced, and the accuracy of the detection results of the wheel alignment apparatus can be improved.

In one embodiment, one end of the first connecting section 51 is connected to the second connecting section 52, and the other end of the first connecting section 51 is connected to the calibration base 12; one end of the second connecting section 52 is connected to the first connecting section 51, and the other end of the second connecting section 52 is connected to the camera device 4.

Here, it can be understood that, in order to expand the distance between the calibration base 12 and the camera device 4 and further reduce the possibility of the camera device 4 blocking the calibration base 12, the calibration base 12 is connected to the end of the first connecting section 51, and the camera device 4 is connected to the end of the second connecting section 52.

Specifically, the first connecting section 51 is connected to the calibration base 12, the end of the first connecting section 51 away from the calibration base 12 is connected to the second connecting section 52, and the end of the second connecting section 52 away from the first connecting section 51 is connected to the camera device 4, so that the camera device 4 is disposed away from the calibration base 12 in both the first direction and the second direction.

By adopting the above technical proposal, the camera device 4 is disposed away from the calibration base 12 in both the first direction and the second direction, thereby reducing the possibility of the camera device 4 blocking the calibration base 12.

In a second aspect, a wheel alignment apparatus is provided, including a wheel alignment measuring device and the above-mentioned wheel alignment calibration device. The wheel alignment measuring device is configured to be located in the calibration direction X and obtain an image of the calibration component 2 to calibrate its own position.

By adopting the above technical proposal, in addition to the advantages of the wheel alignment calibration device of the above embodiments, the wheel alignment apparatus of this embodiment also has the advantage of high calibration accuracy.

The above are only preferred embodiments of the present application and are not intended to limit the present application. Any modifications, equivalent substitutions and improvements made within the spirit and principles of the present application shall fall within the scope of protection of the present application.

What is claimed is:

1. A wheel alignment calibration device, comprising:

a calibration box, a calibration component arranged in the calibration box, and a fixing member connected to the calibration box;

wherein the calibration box defines a calibration direction, the calibration box is provided with a calibration space and a calibration opening communicated with the calibration space, the calibration component is arranged in the calibration space and is able to be exposed to the calibration opening in the calibration direction, the fixing member is configured to fix the calibration box on a lift carrying a vehicle so that an opening direction of the calibration opening is set obliquely downward, and the wheel alignment calibration device is configured to realize calibration based on the calibration direction through the calibration component.

2. The wheel alignment calibration device according to claim 1, wherein, when the calibration box is fixed to the lift, the opening direction of the calibration opening forms a first inclination angle ranging from 0° to 90° with a horizontal plane.

3. The wheel alignment calibration device according to claim 2, wherein the calibration direction and the opening direction of the calibration opening form a second inclination angle, and the second inclination angle is in a range between 0° and 90°.

4. The wheel alignment calibration device according to claim 1, wherein the calibration box defines a plurality of calibration directions facing different directions, and the calibration box is provided with calibration openings respectively corresponding to each of the calibration directions.

5. The wheel alignment calibration device according to claim 1, wherein the calibration box includes a calibration base, a calibration cover and a calibration support, the calibration cover is arranged above the calibration base, the calibration support connects the calibration cover and the calibration base, and the calibration space and the calibration opening are arranged between the calibration base, the calibration cover and the calibration support.

6. The wheel alignment calibration device according to claim 5, wherein edges of a projection of the calibration cover on the calibration base in a direction perpendicular to the calibration base exceed the calibration base, and the calibration support extends outward from the calibration base toward an obliquely upward direction, so that the opening direction of the calibration opening is arranged obliquely downward.

7. The wheel alignment calibration device according to claim 5, wherein the calibration component is connected to the calibration cover, so that the calibration component is orientated inversely in the calibration space.

8. The wheel alignment calibration device according to claim 1, wherein the fixing member extends from the calibration box in a direction toward the lift, and an edge of a contacting surface of the fixing member for connecting with the lift is provided with a chamfered part.

9. The wheel alignment calibration device according to claim 2, wherein the fixing member extends from the calibration box in a direction toward the lift, and an edge of a contacting surface of the fixing member for connecting with the lift is provided with a chamfered part.

10. The wheel alignment calibration device according to claim 3, wherein the fixing member extends from the calibration box in a direction toward the lift, and an edge of a contacting surface of the fixing member for connecting with the lift is provided with a chamfered part.

11. The wheel alignment calibration device according to claim 4, wherein the fixing member extends from the calibration box in a direction toward the lift, and an edge of a contacting surface of the fixing member for connecting with the lift is provided with a chamfered part.

12. The wheel alignment calibration device according to claim 5, wherein the fixing member extends from the calibration box in a direction toward the lift, and an edge of a contacting surface of the fixing member for connecting with the lift is provided with a chamfered part.

13. The wheel alignment calibration device according to claim 8, wherein a handle is arranged on a side of the calibration box facing away from the fixing member, and the handle is disposed to face away from the fixing member.

14. The wheel alignment calibration device according to claim 1, wherein the calibration box further comprises a lighting member, the lighting member is disposed on an inner bottom surface of the calibration box, and a lighting range of the lighting member covers the calibration component.

15. The wheel alignment calibration device according to claim 14, wherein the calibration box further comprises a reflective member, the reflective member is disposed on an inner top surface of the calibration box and is arranged opposite to the lighting member, and the reflective member is configured to reflect lights emitted by the lighting member.

16. The wheel alignment calibration device according to claim 14, wherein the calibration box is further provided with a light-transmitting cover disposed on the calibration opening, and the light-transmitting cover is configured to restrict passage of visible light and allow passage of light of a predetermined wavelength.

17. The wheel alignment calibration device according to claim 16, wherein the light-transmitting cover is made of infrared glass, and the light of the predetermined wavelength is an infrared ray.

18. The wheel alignment calibration device according to claim 5, wherein the wheel alignment calibration device further comprises a camera device and a camera device connector, one end of the camera device connector is connected to the calibration base, and the other end of the camera device connector is connected to the camera device, so that a projection of the camera device and a projection of the calibration component along any calibration direction do not overlap each other.

19. The wheel alignment calibration device according to claim 18, wherein the one end of the camera device connector is connected to a side or bottom of the calibration base, and the other end of the camera device connector is connected to a side or bottom of the camera device.

20. A wheel alignment apparatus, comprising a wheel alignment measuring device and the wheel alignment calibration device according to claim 1, wherein the wheel alignment measuring device is disposed in the calibration direction and configured to obtain an image of the calibration component to calibrate a position of the wheel alignment measuring device.

* * * * *